United States Patent [19]

McCabe et al.

[11] Patent Number: 5,016,714

[45] Date of Patent: May 21, 1991

[54] BIOCIDAL WELL TREATMENT METHOD

[75] Inventors: Michael A. McCabe; J. Michael Wilson; Jimmie D. Weaver; James J. Venditto, all of Duncan, Okla.

[73] Assignee: Halliburton Company, Duncan, Okla.

[21] Appl. No.: 521,815

[22] Filed: May 9, 1990

[51] Int. Cl.$^5$ .................... E21B 43/267; E21B 37/00
[52] U.S. Cl. .................... 166/308; 166/280; 166/312; 252/8.551
[58] Field of Search ............. 166/259, 271, 280, 308, 166/305.1, 312; 252/8.551

[56] References Cited

U.S. PATENT DOCUMENTS

| | | | |
|---|---|---|---|
| 3,199,591 | 8/1965 | Kepley | 252/8.551 X |
| 3,482,636 | 12/1969 | Crowe | 166/312 X |
| 3,853,771 | 12/1974 | Felmann | 166/312 X |
| 4,412,925 | 11/1983 | Ballerini et al. | 166/246 X |
| 4,466,889 | 8/1984 | Miller et al. | 166/246 X |
| 4,686,052 | 8/1987 | Baranet et al. | 166/308 X |
| 4,765,410 | 8/1988 | Rogers et al. | 166/312 X |

FOREIGN PATENT DOCUMENTS 1131404  9/1982  Canada ............................ 166/305.1

OTHER PUBLICATIONS

Hawser, J. D. et al., "Eliminating Bacterial Contamination in Producing Oil and Gas Wells", *Producers Monthly*, vol. 28, No. 11, Nov. 1964, pp. 8–11.

Society of Petroleum Engineers Paper 16218, *Chemical Control of Biogenic $H_2S$ in Producing Formations*, by E. S. Littmann and T. L. McLean, Nalco Chemical Company, (1987).

*Primary Examiner*—George A. Suchfield
*Attorney, Agent, or Firm*—Robert A. Kent

[57] ABSTRACT

Methods of treating a previously fractured bacteria contaminated subterranean formation penetrated by a well bore whereby the bacteria contamination is substantially reduced or eliminated are provided. The methods basically comprise mixing a bactericide with a fracturing fluid in an amount effective to contact and kill bacteria contained in the formation and pumping the mixture into the formation at a rate and pressure sufficient to re-fracture the formation. The re-fracturing of the formation causes the bactericide to be distributed throughout the formation and to contact and kill bacteria contained therein without adversely effecting the productivity of the formation.

11 Claims, No Drawings

BIOCIDAL WELL TREATMENT METHOD

BACKGROUND OF THE INVENTION

1. Field of the Invention

The present invention relates to the treatment of bacteria contaminated wells, and more particularly, to methods of treating previously fractured bacteria contaminated subterranean formations to substantially reduce or eliminate such contamination.

2. Description of the Prior Art

The presence of anaerobic bacteria in an oil and/or gas producing formation, and particularly sulfate reducing bacteria (SRB), cause a variety of problems. If the bacteria produce sludge or slime, they can cause a reduction in the porosity of the formation which in turn reduces the production of oil and/or gas therefrom. Sulfate reducing bacteria produce hydrogen sulfide, and the problems associated with hydrogen sulfide production, even in small quantities, are well known. The presence of hydrogen sulfide in produced oil and gas can cause excessive corrosion in metal tubular goods and surface equipment, a lower oil selling price, and the necessity to remove hydrogen sulfide from gas prior to sale.

When the fluids utilized in drilling or stimulating oil or gas wells contain bacteria, the producing formations can become contaminated with the bacteria. Such contaminated formations which have been fractured have heretofore been particularly difficult or impossible to treat. That is, prior attempts to introduce one or more bactericides into such formations to contact and kill the bacteria therein have been largely unsuccessful due to the bacteria being located in or near fractures at long distances from the well bores. When treating fluids containing bactericides have been pumped into such previously fractured contaminated formations, the treating fluids have either failed to reach the locations of the bacteria, and/or the proppant materials in the previously formed fractures have been disturbed thereby reducing the productivities of the formations.

By the present invention, improved methods of treating previously fractured bacteria contaminated subterranean formations are provided whereby the bacteria are substantially eliminated without lowering the productivities of the formations.

SUMMARY OF THE INVENTION

Methods of treating previously fractured bacteria contaminated subterranean formations penetrated by well bores are provided. The methods basically comprise the steps of mixing a bactericide with a fracturing fluid in an amount effective to contact and kill bacteria contained in the formation to be treated when the resulting mixture is pumped thereinto, and pumping the bactericide-fracturing fluid mixture into the formation at a rate and pressure sufficient to re-fracture the formation. The re-fracturing of the formation causes the bactericide to be distributed throughout the formation and to contact and kill bacteria contained therein. The fracturing fluid normally contains a gelling agent to increase the viscosity thereof, and proppant material is suspended in the fracturing fluid during the fracturing process so that proppant material is placed in the fractures and the productivity of the formation is not reduced.

In a preferred method of the present invention a bactericide is mixed with a carrier fluid having high fluid loss characteristics, and the resulting bactericide-carrier fluid mixture is pumped into the contaminated formation at a relatively low rate so that bacteria contained in portions of the formation adjacent the well bore are contacted with the bactericide prior to when the formation is fractured. A bactericide is then mixed with a fracturing fluid and the resulting bactericide-fracturing fluid mixture is pumped into the formation at a rate and pressure sufficient to refracture the formation. The re-fracturing of the formation causes the bactericide to be carried long distances into the formation and into or adjacent previously formed fractures containing bacteria whereby the bacteria are contacted and killed by the bactericide. Proppant material is placed in the fractures so that the treated formation retains good productivity.

Objects, features and advantages of the present invention in addition to those mentioned above will be apparent to those skilled in the art upon a reading of the description of preferred embodiments which follows.

DESCRIPTION OF THE PREFERRED EMBODIMENTS

The present invention provides methods of reducing or eliminating bacteria contamination in previously fractured subterranean formations. In such formations, the bacteria contamination usually has been introduced thereinto with drilling or treating fluids when the well was drilled and completed and/or when the producing formation was fractured. Because the formation was fractured, the bacteria can not only be in portions of the formation adjacent to the well bore, but the bacteria can be long distances from the well bore as a result of having been carried into fractures in the formation by the fracturing fluid. The method of the present invention is effective in killing the near-well bore bacteria as well as bacteria located in or near propped fracture beds long distances from the well bore.

In accordance with the present invention, one or more bactericides are mixed with a fracturing fluid in an amount effective to contact and kill bacteria contained in the formation to be treated when the resulting bactericide-fracturing fluid mixture is pumped thereinto. The bactericide-fracturing fluid mixture is then pumped into the formation at a rate and pressure sufficient to re-fracture the formation, and thereby cause the bactericide to be distributed throughout at least a portion of the formation. The refracturing treatment is conducted in a conventional manner to reopen the original fractures or otherwise place fractures near the original fractures whereby the fracturing fluid and bactericide reach the original propped fracture beds, either directly or by flowing through the pores in the formation from new fractures to the old fracture beds. The new fractures, whether coincident with the original fractures or not, are preferably propped in the usual manner by proppant material carried into the fractures with the fracturing fluid. While the exact control of the location of the new fractures is not always possible, the new fractures may lie relatively close to the original propped fracture beds whereby the leak off of the fracturing fluid and bactericide therefrom flows into the original fracture beds contacting and killing bacteria contained therein.

The problem causing bacteria which most commonly contaminate subterranean well formations are sulfate reducing bacteria and slime or sludge producing bacteria. As mentioned above, the sulfate reducing bacteria cause the fluids produced from contaminated formations to contain hydrogen sulfide, and the sludge or slime producing bacteria tend to plug the formation.

The bactericides which can be utilized in accordance with the present invention are any of the various commercially available bactericides which kill anaerobic sulfate reducing and sludge or slime forming bacteria upon contact, and which are compatible with the fracturing fluid utilized and components of the formation into which they are introduced. The term "compatible" is used herein to mean that the bactericide is stable, does not react with or adversely affect components of the fracturing fluid or formation and is not neutralized by components in the formation. Examples of preferred bactericides are solutions of 5-chloro-2-methyl-4-isothiazolin-3-one and 2-methyl-4-isothiazolin-3one; hexahydro-1,3,5-triethyl-s-triazine; alkyl-aryl triethylammonium chloride solution; methylene bis(thiocyanate); 2,2-dibromo-nitrilopropionamide; 2-bromo-2-nitropropane-1,3-diol; 2-methyl-5-nitroimidazole-1-ethanol or a combination of the foregoing bactericides. Additional examples include sodium hypochlorite/sodium hydroxide admixtures, lithium and calcium hypochlorite, hydrogen peroxide and the like.

While any hydrocarbon or aqueous based fluid can be used for fracturing the subterranean formation to be treated using known formation fracturing techniques, aqueous fluids containing one or more viscosity increasing gelling agents are generally most suitable. The gelling agent or agents can comprise, for example, hydratable polymers which contain, in sufficient concentration and reactive position, one or more functional groups such as hydroxyl, cishydroxyl, carboxyl, sulfate, sulfonate, amino or amide. Particularly suitable such polymers are polysaccharides and derivatives thereof which contain one or more of the following monosaccharide units: galactose, mannose, glucoside, glucose, xylose, arabinose, fructose, glucuronic acid or pyranosyl sulfate. Natural hydratable polymers containing the foregoing functional groups and units include guar gum and derivatives thereof, locust beam gum, tara, konjak, tamarind, starch, cellulose and derivatives thereof, karaya, xanthan, tragacanth and carrageenan. Hydratable synthetic polymers and copolymers which can contain the above-mentioned functional groups and which can be utilized include polyacrylate, polymethacrylate, polyacrylamide, polyvinyl alcohol and polyvinylpyrrolidone.

In preparing the fracturing fluid, one or more gelling agents of the type described above are mixed with an aqueous liquid, and the gelling agent or agents are allowed to hydrate whereby the viscosity of the aqueous liquid is increased to a desired level. A variety of other additives can be utilized in the fracturing fluid so long as they are compatible with the bactericide utilized, e.g., crosslinking agents, fluid loss control agents, friction reducing agents, surfactants etc. As stated above, such fracturing fluids and their use in fracturing subterranean formations as well as the various additives and their functions are well known to those skilled in the art.

The gelling agent or agents used, depending upon formation conditions and other factors, are generally mixed with the aqueous liquid in an amount in the range of from about 10 lbs. of gelling agent to about 80 lbs. of gelling agent per 1000 gallons of the aqueous liquid.

As mentioned above, the bactericide is mixed with the fracturing fluid in a concentration effective to contact and kill the bacteria contained in the formation to be treated when the bactericide-fracturing fluid mixture is pumped thereinto. Generally, when the bactericide is in concentrated form, it is mixed with the fracturing fluid in an amount in the range of from about 10 ppm to about 10,000ppm of the resulting bactericide-fracturing fluid mixture.

When a preferred bactericide described above is utilized, i.e., a 12% by weight solution of 5-chloro-2-methyl-4-isothiazolin-3-one and 2-methyl-4-isothiazolin-3-one, it is mixed with the fracturing fluid in an amount in the range of from about 0.1% to about 0.0001% by volume of the resulting bactericide solution-fracturing fluid mixture.

Proppant material is usually combined with the bactericide-fracturing fluid mixture during the process of re-fracturing the subterranean formation being treated so that the proppant material is carried into and deposited in the fractures. The proppant material can comprise, for example, sand, graded gravel, glass or ceramic beads, sintered bauxite, resin-coated sand or the like. The mixing of the proppant material with the fracturing fluid can be effected in any suitable mixing apparatus such as for example, a batch mixer or the like. The particular amount of proppant material mixed with the fracturing fluid can be varied to provide the desired amount of proppant in the formed fractures. Depending upon the particular formation conditions, the amount of proppant material can range from about ½ lb. to about 25 lbs. per gallon of fracturing fluid.

In order to insure that bacteria which may be present in portions of the subterranean formation adjacent the well bore are contacted with bactericide and killed, a carrier fluid having high fluid loss characteristics and containing bactericide can be introduced into the near-well bore portions of the formation. That is, prior to re-fracturing the formation, a bactericide is mixed with a carrier fluid in an amount effective to kill bacteria contacted thereby. The carrier fluid is preferably a fluid having high fluid loss characteristics so that it readily flows through the pores of the formation, e.g., ungelled water. The resultant bactericide-carrier fluid mixture is pumped into the formation at a rate and in a quantity such that bacteria in nearwell bore portions of the formation are contacted and killed.

The bactericide mixed with the carrier fluid and utilized in the initial near-well bore treatment can be the same as or different from the bactericide utilized in the fracturing fluid. For example, the bactericide used for the initial near-well bore treatment can be a mixture of sodium hypochlorite and sodium hydroxide or the like which cannot be used in the fracturing fluid due to its adverse affect on hydrated gelling agents. The bactericide used is generally mixed with the carrier fluid in an amount in the range of from about 0.1% to about 0.0001% by volume of the resultant bactericide-carrier fluid mixture. When such bactericide is, for example, a mixture of sodium hypochlorite and sodium hydroxide, it is preferably mixed with the carrier fluid in an amount in the range of from about 0.005% to about 0.1% by volume of the resultant bactericide-carrier fluid mixture.

A particularly suitable method of the present invention for treating a previously fractured bacteria contaminated subterranean formations whereby the bacteria contamination is substantially reduced or eliminated comprises mixing a bactericide with a carrier fluid having high fluid loss characteristics in an amount in the range of from about 0.1% to about 0.0001% by volume of the resulting bactericide-carrier fluid mixture. The bactericide-carrier fluid mixture is pumped into the formation so that bacteria in portions of the formation adjacent the well bore are contacted and killed. Preferably, the bactericide-carrier fluid mixture is pumped into the near-well bore portions of the formation at a relatively low rate whereby the formation is not fractured and whereby the high fluid loss characteristics of the carrier fluid causes it as well as the bactericide to flow through the pores of the formation into contact with bacteria contained therein.

A bactericide which is compatible with the formation as well as with the particular fracturing fluid used is next mixed with a fracturing fluid in an amount in the range of from about 0.1% to about 0.0001% by volume of the resulting bactericide-fracturing fluid mixture. The bactericide-fracturing fluid mixture is pumped into the formation at a rate and pressure sufficient to re-fracture the formation and thereby cause the bactericide to be distributed throughout the formation including locations long distances from the well bore, e.g., in the previously formed propped fracture beds.

In carrying out the near-well bore portion of the above-described procedure, the carrier fluid is preferably water and the bactericide is preferably a mixture of sodium hypochlorite and sodium hydroxide. The sodium hypochlorite-sodium hydroxide mixture is preferably present in the water at a concentration so that a minimum of 5ppm chlorine is present.

In carrying out the re-fracture portion of the above-described method, the fracturing fluid is preferably water gelled with a hydratable polymer gelling agent, e.g., hydroxypropylguar, in an amount of from about 10 to about 80 lbs. per 1000 gallons of the fracturing fluid, and the bactericide is preferably a 12% by weight solution of 5-chloro-2-methyl-4-isothiazolin-3-one and 2-methyl-4-isothiazolin-3-one. The bactericide solution is preferably mixed with the fracturing fluid in an amount in the range of from about 0.1% to about 0.0001% by volume of the resulting bactericide solution-fracturing fluid mixture. During the re-fracturing process, proppant material, e.g., sand, is preferably combined with the bactericide-fracturing fluid mixture so that the proppant material is carried into and placed in the fractures formed. The proppant material is combined with the bactericide-fracturing fluid mixture, depending on formation conditions, in increasing amounts ranging from about ½ lb. to about 25 lbs. per 1000 gallons of fracturing fluid. Upon completion of the re-fracturing treatment, the well bore is preferably shut-in for a time period of from about 1 hour to about 2 weeks in order to allow the bactericide to leak off from the fractures formed and flow through the pores of the formation into contact with bacteria contained therein.

In order to further illustrate the present invention and to facilitate a clear understanding thereof the following example is given.

EXAMPLE

A treatment is performed on a well in the Oriskany formation in the state of West Virginia. The well is perforated at a level of about 7900 feet and the formation has a permeability of about 0.1 millidarcy and a porosity of about 3%. The bottom hole temperature is about 153° F. The formation was fractured shortly after it was drilled and completed.

The treatment is effected by pumping the fluids used through a 2⅜ inch tubing string positioned in the well bore. A spearhead near-well bore treatment fluid is prepared by combining sodium hypochlorite and sodium hydroxide with water such that the resulting solution contains about 0.63% sodium hypochlorite and 4% sodium hydroxide by weight. 20,000 gallons of the bactericide-water solution are pumped into the formation at a rate of about 18 barrels per minute and a pressure of 7200 psig.

A fracturing fluid comprised of water containing 40 lbs. per 1000 gallons of hydroxypropylguar gelling agent is prepared to which a bactericide, i.e., a 12% by weight solution of 5-chloro-2-methyl-4-isothiazolin-3-one and 2-methyl-4-isothiazolin-3-one, is added in an amount of about 0.0005% by volume of the resulting bactericide-fracturing fluid mixture. The fracturing fluid also contains other additives comprised of nonionic surfactant, cationic clay control agent, neutral pH buffer system, particulate fluid loss additive, peroxy gel breaker, and titanium cross-linker.

A prepad of 20,000 gallons of the bactericide-fracturing fluid mixture is pumped into the formation at a rate of 18 barrels per minute and a pressure of about 7200 psig. A pad of 10,000 gallons of the bactericide-fracturing fluid mixture is next pumped into the formation followed by an additional 30,000 gallons of the bactericide-fracturing fluid mixture having increasing quantities of 20/40 mesh sand therein. The concentration of the sand is increased from about 0.5 lbs. per gallon of the fracturing fluid to about 4 lbs. per gallon thereof. After the re-fracturing of the formation with the bactericide-fracturing fluid mixture and proppant material (sand) is completed, the well bore is shut in for a period of about 12 hours to allow the bactericide to leak off from the new fractures formed through the pores of the formation whereby it contacts and kills bacteria contained therein.

Thus, the present invention is well adapted to attain the objects, ends and advantages mentioned as well as those inherent therein. While numerous changes in particular components used and the arrangement of steps may be made by those skilled in the art, such changes are emcompassed within the spirit of this invention as defined by the appended claims.

What is claimed is:

1. A method of treating a previously fractured bacteria contaminated subterranean formation penetrated by a well bore whereby said bacteria contamination is substantially reduced or eliminated comprising the steps of:

mixing a bactericide with a carrier fluid in an amount effective to contact and kill bacteria contained in said formation when the resultant mixture is pumped thereinto, said carrier fluid having high fluid loss characteristics;

pumping said mixture into said formation through said well bore so that bacteria contained in near-well bore portions of said formation are contacted with bactericide mixing a bactericide with a fracturing fluid in an amount effective to contact and kill bacteria contained in said formation when the resulting mixture is pumped thereinto; and pumping said mixture into said formation through said well bore at a rate and pressure sufficient to refracture said formation and thereby cause said bactericide to be distributed throughout said formation and to contact and kill at least a portion of any bacteria contained therein.

2. A method of treating a previously fractured bacteria contaminated subterranean formation penetrated by a well bore whereby said bacteria contamination is substantially reduced or eliminated comprising the steps of:

mixing a bactericide with a carrier fluid in an amount in the range of from about 0.1% to about 0.0001% by weight of the resulting bactericide-carrier fluid mixture, said carrier fluid having high fluid loss characteristics;

pumping said bactericide-carrier fluid mixture into said formation through said well bore so that bacteria contained in near-well bore portions of said formation are contacted with bactericide;

mixing a bactericide with a fracturing fluid in an amount in the range of from about 0.1% to about 0.0001% by weight of the resulting bactericide-fracturing fluid mixture; and pumping said bactericide-fracturing fluid mixture into said formation through said well bore at a rate and pressure sufficient to re-fracture said formation and thereby cause said bactericide to be distributed throughout said formation and to contact additional bacteria contained therein whereby bacteria contamination is substantially reduced or eliminated.

3. The method of claim 2 wherein said bactericide mixed with said carrier fluid is selected from the group consisting of a mixture of sodium hypochlorite and sodium hydroxide, lithium hypochlorite and calcium hypochlorite.

4. The method of claim 2 wherein said bactericide mixed with said fracturing fluid is compatible with said fracturing fluid and with said formation and kills anaerobic bacteria on contact therewith.

5. The method of claim 2 wherein said bacteria contamination includes sulfur reducing bacteria, and said bactericide is selected from the group consisting of a solution of 5-chloro-2-methyl-4-isothiazolin-3-one and 2-methyl-4-isothiazolin-3-one, hexahydro-1,3,5-triethyl-s-triazine, alkyl-aryl triethylammonium chloride, methylene bis(thiocyanate), 2,2-dibromo-nitrilopropionamide, 2-bromo-2-nitro-propane-1,3-diol and 2-methyl-5-nitroimidazole-1-ethanol.

6. The method of claim 2 wherein said carrier fluid and said fracturing fluid are both aqueous liquids.

7. The method of claim 6 wherein said fracturing fluid contains a gelling agent comprising a hydratable polymer.

8. The method of claim 2 wherein said fracturing fluid contains a proppant material.

9. The method of claim 7 wherein said gelling agent is present in said aqueous liquid in an amount in the range of from about 10 lbs. to about 80 lbs. per 1000 gallons of said aqueous liquid.

10. The method of claim 8 wherein said proppant material is present in said fracturing fluid in amounts ranging from about 0.5 lb. to about 25 lbs. per 1000 gallons of fracturing fluid.

11. The method of claim 2 wherein said bactericide mixed with said carrier fluid is a mixture of sodium hypochlorite and sodium hydroxide, and said bactericide mixed with said fracturing fluid is a solution of 5-chloro-2-methyl-4-isothiazolin-3-one and 2-methyl-4-isothiazolin-3-one.

* * * * *